United States Patent
Tada et al.

(10) Patent No.: US 8,523,231 B2
(45) Date of Patent: Sep. 3, 2013

(54) RIDING MOWER

(75) Inventors: Hiroyuki Tada, Sakai (JP); Yoshikazu Togoshi, Osaka (JP); Kazuaki Nogami, Osaka (JP); Akira Minoura, Osaka (JP)

(73) Assignee: Kubota Corporation, Osaka (JP)

( * ) Notice: Subject to any disclaimer, the term of this patent is extended or adjusted under 35 U.S.C. 154(b) by 6 days.

(21) Appl. No.: 13/242,041

(22) Filed: Sep. 23, 2011

(65) Prior Publication Data

US 2012/0247077 A1    Oct. 4, 2012

(30) Foreign Application Priority Data

Mar. 31, 2011    (JP) ................................. 2011-079894

(51) Int. Cl.
     *A01D 34/24*      (2006.01)

(52) U.S. Cl.
     USPC .......................................... 280/830; 280/834

(58) Field of Classification Search
     USPC .................................................. 280/830, 834
     See application file for complete search history.

(56) References Cited

U.S. PATENT DOCUMENTS

| | | | |
|---|---|---|---|
| 2,931,452 A * | 4/1960 | Mackie | 180/69.21 |
| 3,311,183 A * | 3/1967 | Phillips | 180/54.1 |
| 4,025,080 A * | 5/1977 | Gedeon | 280/834 |
| 4,090,579 A * | 5/1978 | Stedman | 180/69.2 |
| 4,150,456 A * | 4/1979 | Alvarez et al. | 15/49.1 |
| 5,199,521 A * | 4/1993 | Samejima et al. | 180/68.1 |
| 5,203,046 A * | 4/1993 | Shaw | 15/98 |
| 5,330,031 A * | 7/1994 | Hill et al. | 180/271 |
| 5,581,986 A * | 12/1996 | Calver | 56/12.7 |
| 5,634,665 A * | 6/1997 | Jung | 280/834 |
| 5,845,940 A * | 12/1998 | Colburn | 280/830 |
| 5,884,460 A * | 3/1999 | Serravalle et al. | 56/1 |
| 5,946,894 A * | 9/1999 | Eavenson et al. | 56/16.7 |
| 5,947,219 A * | 9/1999 | Peter et al. | 180/68.1 |
| 6,003,401 A * | 12/1999 | Smith | 74/496 |
| 6,637,706 B2 * | 10/2003 | Kim et al. | 248/154 |
| 6,659,209 B2 * | 12/2003 | Osuga et al. | 180/53.8 |
| 6,675,567 B2 * | 1/2004 | Samejima et al. | 56/16.7 |
| 6,676,163 B2 * | 1/2004 | Joitescu et al. | 280/834 |
| 7,097,186 B2 * | 8/2006 | Uematsu et al. | 280/124.112 |
| 7,240,472 B2 * | 7/2007 | Evers | 56/202 |
| 7,334,818 B2 * | 2/2008 | Mascarenhas et al. | 280/830 |
| 7,621,565 B2 * | 11/2009 | Ross et al. | 280/830 |
| 8,172,268 B2 * | 5/2012 | Komorida et al. | 280/830 |
| 8,277,528 B2 * | 10/2012 | Umemoto et al. | 55/385.3 |
| 2008/0289309 A1 * | 11/2008 | Gust et al. | 56/11.9 |
| 2010/0242924 A1 * | 9/2010 | Ochi et al. | 123/519 |

FOREIGN PATENT DOCUMENTS

JP      2000-351330      12/2000

\* cited by examiner

*Primary Examiner* — Kevin Hurley
*Assistant Examiner* — Michael Stabley
(74) *Attorney, Agent, or Firm* — Greenblum & Bernstein, P.L.C.

(57) ABSTRACT

A riding mower includes a pair of right and left front wheels; a pair of right and left rear wheels; a driver's seat provided between the rear wheels and the front wheels; an engine provided in the rear of the driver's seat; and a mower provided under the driver's seat. The riding mower is capable of being mounted with a fuel gas cylinder sideways on a side of the engine in which an operation section of the fuel gas cylinder faces backward. The riding mower further includes a guard member that is opposed to a rear surface of the fuel gas cylinder and is switchable between a protection position to cover the rear side of the operation section and an open position to open the rear surface of the fuel gas cylinder.

6 Claims, 10 Drawing Sheets

RIDING MOWER

CROSS-REFERENCE TO RELATED APPLICATIONS

The present application claims priority under 35 U.S.C. §119 of Japanese Application No. 2011-079894, filed on Mar. 31, 2011, which is herein expressly incorporated by reference in its entirety.

BACKGROUND OF THE INVENTION

1. Field of the Invention

The present invention relates to a riding mower that includes rear wheels for running; a pair of right and left steerable front wheels; a driver's seat provided between the rear wheels and the front wheels; and an engine provided in the rear of the driver's seat.

2. Description of Related Art

As described in Related Art 1, this kind of riding mower is generally mounted with a gasoline engine, and a fuel tank is provided under an engine hood or under a rear wheel fender between the rear wheel fender and the rear wheels.

[Related Art 1] Japanese Patent Laid-Open Publication No. 2000-351330 (paragraph [0029]; FIGS. 1 and 2)

Use of fuel gas, such as LP gas, has recently been attempted as an alternative fuel to gasoline for the purpose of reducing $CO_2$ and cutting fuel cost. To use the fuel gas, such as LP gas, however, a large-sized gas cylinder should be mounted for driving. It is difficult in view of space to place such a gas cylinder under an engine hood or under a rear wheel fender.

It is thus considered to dispose the gas cylinder sideways on the engine hood or on the external side of the engine hood in which the shaft center of the gas cylinder extends in the anteroposterior direction. In either case, a gas outlet and the like of the gas cylinder may be damaged by a tree branch and the like at the time of working, or moving forward or backward before or after working.

SUMMARY OF THE INVENTION

An advantage of the present invention is to provide a riding mower mounted with a fuel gas cylinder in which a possibility that an operation section such as a gas outlet of the gas cylinder will contact a tree branch and the like is reduced.

An aspect of the present invention provides a riding mower that includes a pair of right and left front wheels; a pair of right and left rear wheels; a driver's seat provided between the rear wheels and the front wheels; an engine provided in the rear of the driver's seat; and a mower provided under the driver's seat. The riding mower is capable of being mounted with a fuel gas cylinder sideways on a side of the engine in which an operation section of the fuel gas cylinder faces backward. The riding mower further includes a guard member that is opposed to a rear surface of the fuel gas cylinder and is switchable between a protection position to cover the rear side of the operation section and an open position to open the rear surface of the fuel gas cylinder.

According to the riding mower of this aspect, by mounting the fuel gas cylinder sideways in which the operation section of the fuel gas cylinder faces backward, it is possible to reduce a likelihood that the operation section of the fuel gas cylinder will be inadvertently operated or damaged by a tree branch and the like in a grass-mowing area at the time of moving the riding mower forward that generally happens more often than moving backward. Also, by covering the rear surface of the fuel gas cylinder with the guard member set in the protection position, it is possible to reduce a likelihood that the operation section of the fuel gas cylinder will be inadvertently operated or damaged by a tree branch and the like in a grass-mowing area at the time of moving the riding mower backward. Further, the rear surface of the fuel gas cylinder can be opened by switching the guard member into the open position at the time of unloading the fuel gas cylinder from the riding mower. It is thus possible to reduce a likelihood that the guard member will interfere with unloading work of the fuel gas cylinder, or an operation such as opening and closing of a valve through the operation section of the fuel gas cylinder.

Another aspect of the present invention provides the riding mower, in which an upper end of the guard member in the protection position is located lower than an inner surface of an upper end portion of a tubular or annular valve protection member projecting backward from the rear surface of the fuel gas cylinder.

According to the riding mower of this aspect, it is possible to easily work to visually confirm an indicated value of an fuel gauge, provided in the operation section of the fuel gas cylinder, from a gap between the valve protection member in the rear surface of the fuel gas cylinder and the upper end of the guard member without changing the position of the guard member from the protection position to the open position side at the time of stopping the riding mower, while achieving a main purpose that the operation section of the fuel gas cylinder is protected from a tree branch and the like.

Another aspect of the present invention provides the riding mower, in which the guard member is swingably supported around a lateral shaft center in a lower portion of the guard member.

According to the riding mower of this aspect, when the guard member is switched into the open position, a space above the rear surface of the fuel gas cylinder is sufficiently opened, and thereby it is easier to perform loading and unloading work of the fuel gas cylinder, or an operation through the operation section of the fuel gas cylinder, compared to a structure in which the guard member is swingably supported around a lateral shaft center in an upper portion of the guard member or around a vertical shaft center.

Another aspect of the present invention provides the riding mower, in which the guard member is pivotally supported in a retaining member that retains the fuel gas cylinder, and an attitude regulating mechanism is provided between the guard member and the retaining member to regulate the attitude of the guard member in the open position to be in a range where the upper end of the guard member does not project backward from the vicinity of a rear end of the hood.

The riding mower of this aspect has an advantage in that there is little likelihood that a part of the guard member will collide with a wall of a building and the like even when the guard member is inadvertently switched into the open position for loading and unloading the fuel gas cylinder.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt made to show structural details of the present invention in more detail than is necessary for the fundamental understanding of the present invention, the description is taken with the drawings making apparent to those skilled in the art how the forms of the present invention may be embodied in practice.

An embodiment of the present invention is explained below with reference to the drawings.

Overall Structure of Riding Mower

Figure 1:
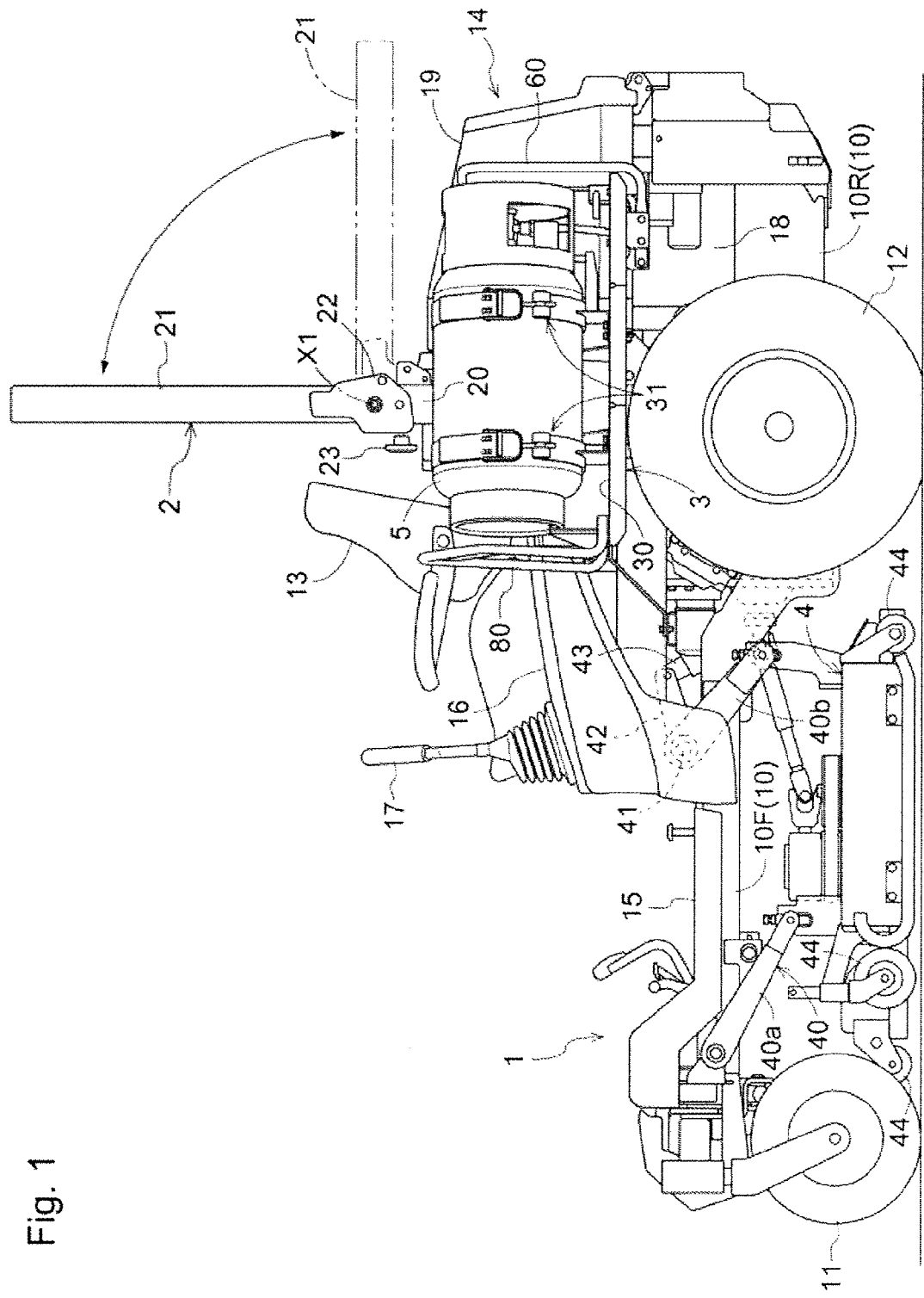
FIG. 1 is an overall side view of a riding mower.
Figure 2:
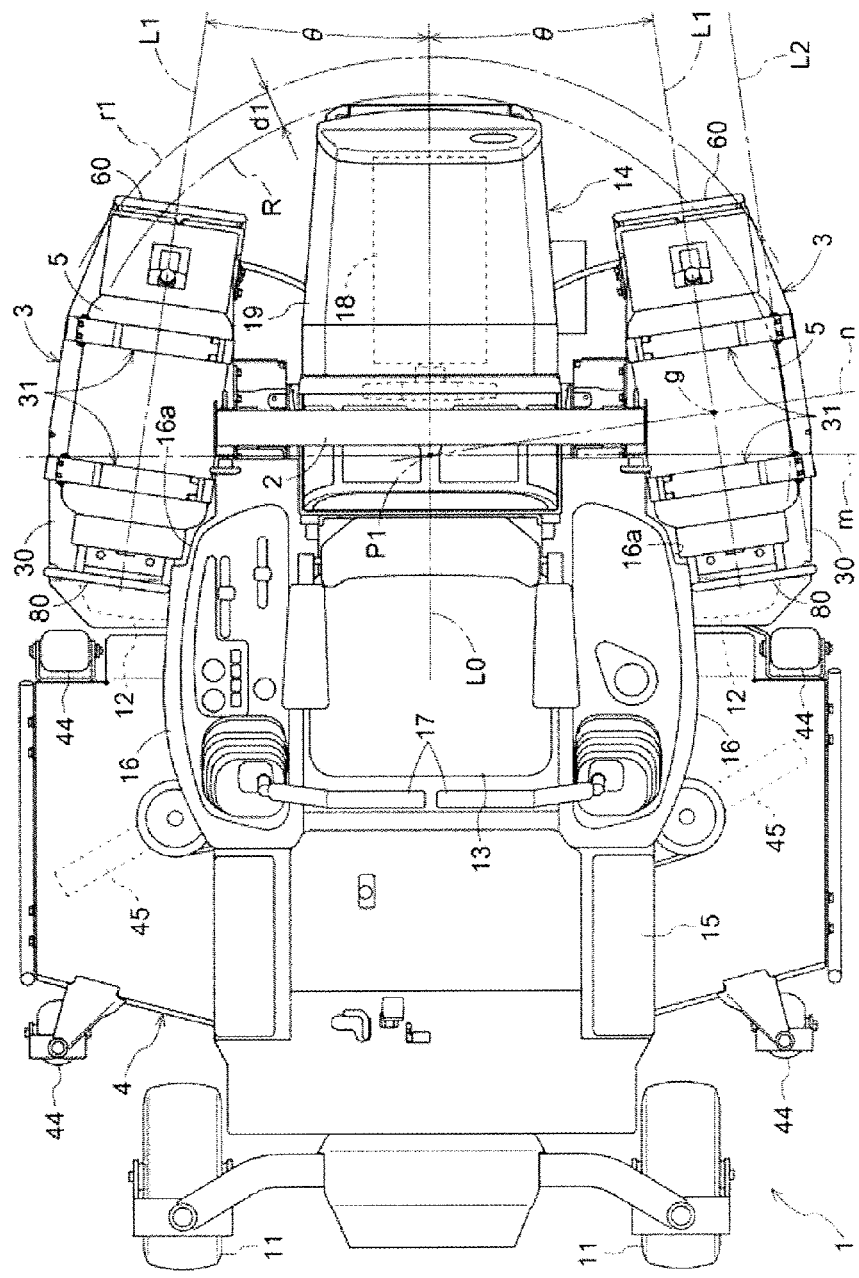
FIG. 2 is an overall plan view of the riding mower.

FIG. 1 is an overall side view of a riding mower according to the present invention. FIG. 2 is an overall plan view thereof. The riding mower is a mid-mount design that has a bar blade type mower 4 vertically movably suspended and supported between a pair of right and left steerable front wheels 11 and driving rear wheels 12 of a self-propelled vehicle body 1 having a vehicle frame 10 supported by the front and rear wheels.

Under a hood 19 in the rear of the self-propelled vehicle body 1, a motor portion 14 housing a water-cooled engine 18 is provided on a rear frame portion 10R of the vehicle frame 10. In an anteroposteriorly intermediate portion of the self-propelled vehicle body 1, a driver's seat 13 is positioned in a space between the front wheels 11 and the rear wheels 12 in the anteroposterior direction.

The motor portion 14 houses the engine 18 under the hood 19 provided with the motor portion 14 on the rear frame portion 10R of the vehicle frame 10. In a front frame portion 10F of the vehicle frame 10, a step 15 is mounted to a feet resting area of the driver's seat 13, and fenders 16 are provided on the left and right sides of the driver's seat 13. In order to avoid interference with a gas cylinder 5 mounted on a support device 3 hereinafter described (in order to place the gas cylinder 5 as inside as possible), each of the left and right fenders 16 has a recess end 16a cutting out a part of a rear external side thereof partially to go along the external shape of the gas cylinder 5, as shown in FIG. 2.

A gate-shaped rollover protection frame 2 stands substantially perpendicularly viewed from a side in the rear of the driver's seat 13, the rollover protection frame 2 having a lower end side on the left and right fixed to the vehicle frame 10. The rollover protection frame 2 is provided with a columnar lower frame 20, an arch-shaped upper frame 21, and a connecting member 22, the lower frame 20 having the lower end side fixed to the vehicle frame 10, the upper frame 21 connecting to the upper end side of the lower frame 20, the connecting member 22 connecting the upper frame 21 to the lower frame 20.

The upper frame 21 is mounted on the connecting member 22 fixed to the lower frame 20 so as to stand upright and fall flat around a swing support X1 provided to the connecting member 22 and extend substantially horizontally. The upper frame 21 is switchable between an upright position and a horizontal position. In the upright position, a fixing bolt 23 is fastened and fixed such that the upper frame 21 stands along an extension line of the lower frame 20. In the horizontal position, the fixing bolt 23 is loosened to push the upper frame 21 down to the rear side. With the foldable structure of the rollover protection frame 2, grass around a tree trunk can be mowed while the folded rollover protection frame 2 is not caught by extending branches.

The support device 3 of the gas cylinder 5 hereinafter described is provided on each of the left and right external sides of the rollover protection frame 2. The gas cylinder 5 is mounted on the support device 3, the gas cylinder 5 being filled with LP gas as fuel supplied to the engine 18. The LP gas extracted from the gas cylinder 5 is supplied to a fuel injection device of the engine 18, and thereby the engine 18 operates on the supplied LP gas as fuel.

The left and right pair of front wheels 11 are caster-type free rotating wheels. The left and right pair of rear wheels 12 are driving wheels independent from each other and capable of variable speed and forward and reverse operation. Driving the left and right rear wheels 12 forward or reverse together at an equal speed runs the vehicle straight forward or backward. Applying differential speeds to the left and right rear wheels 12 steers or turns the vehicle in a desired direction. Specifically, an axial plunger-type hydraulic continuously variable transmission (not shown in the drawing) is provided for the left and right to be powered by the engine 18. Output power from the hydraulic continuously variable transmission for the left and right drives the left and right rear wheels 12. A tilt angle operation section of the hydraulic continuously variable transmission and change speed levers 17 are linked, the change speed levers 17 being anteroposteriorly swingably provided on the left and right of the driver's seat 13. Thus, when the change speed levers 17 are held at a neutral position in the anteroposterior direction within an operation area thereof, the hydraulic continuously variable transmission is put into a neutral stop state. Shifting the change speed levers 17 forward from the neutral position enables forward change speed operation, and shifting backward enables backward change speed operation.

When the left and right rear wheels 12 are driven at the same speed in rotation directions opposite to each other around a pivoting center P1 (see FIG. 2) as a central position of a line connecting rotation axial centers of the rear wheels 12 from a plan view, specifically when the first change speed lever 17 of the left and right pair is shifted forward from the neutral position in the anteroposterior direction in the operation range and the second change speed lever 17 is shifted backward from the neutral position in the operation range for the amount operated forward with the first change speed lever 17, the self-propelled vehicle body 1 is driven to pivot around the pivoting center P1.

Furthermore, when the first change speed lever 17 of the left and right pair is held at the neutral position in the anteroposterior direction in the operation range and the second change speed lever 17 is shifted forward or backward from the neutral position in the operation range, the self-propelled vehicle body 1 pivots around a ground contact point of one of the left and right rear wheels 12 as a pivoting point. On the contrary, when the second change speed lever 17 of the left and right pair is held at the neutral position in the anteroposterior direction in the operation range and the second change speed lever 17 is shifted forward or backward from the neutral position in the operation range, the self-propelled vehicle body 1 pivots around a ground contact point of the other rear wheel 12 of the left and right as a pivoting point.

The mower 4 is suspended and held to the vehicle frame 10 by a link mechanism 40 connected by a left and right pair of front swing links 40a and a left and right pair of rear swing links 40b. A swing arm 42 is connected to the link mechanism 40, the swing arm 42 being integrally provided to a support shaft 41 that swingably supports the rear swing links 40b. The swing arm 42 is configured to swing in association with expansion and contraction of a hydraulic cylinder 43 provided to a space with the vehicle frame 10. The link mechanism 40 is thus operated to move up and down the mower 4, which is switched between a down state of working and an up state of non-working. In the down state of working, a gauge wheel 44 touches or substantially touches the ground. In the up state of non-working, the gauge wheel 44 is detached from the ground to be stowed in a lower portion of the vehicle frame 10. The mower 4 is a rear-discharge type that discharges grass cut by a bar blade 45 from a discharge outlet (not shown in the drawing) positioned on the rear side of the self-propelled vehicle body 1.

Support Device of Gas Cylinder

As shown in FIGS. 1 to 6, the support device 3 of the gas cylinder 5 is provided with a support base 30, a wrap fastener 31, an anteroposterior positioner 32, and a circumferential positioner 33. The support base 30 is attached to the rollover protection frame 2. The wrap fastener 31 fixes the gas cylinder 5 to the support base 30 in a mount state. The anteroposterior positioner 32 determines the mounting position of the gas cylinder 5 in the anteroposterior direction. The circumferential positioner 33 positions the gas cylinder 5 around an axial line.

The support base 30 is integrally provided with a mounting plate 30A (see FIG. 6), a base plate 30B, and triangular reinforcement connecting plates 30C. The mounting plate 30A is fixed to mounting brackets 24 with mounting bolts 25, the mounting brackets 24 being welded and fixed to the front and rear of the lower frame 20 of the rollover protection frame 2. The base plate 30B extends externally to a side from the lower end of the mounting plate 30A. The reinforcement connecting plates 30C are welded and connected at two positions in the anteroposterior direction each in contact with the mounting plate 30A and the base plate 30B on two sides.

The base plate 30B is provided substantially in parallel with the anteroposterior centerline L0 of the self-propelled vehicle body 1 from a plan view such that the left and right side portions of the base plate 30B are provided along the anteroposterior direction of the self-propelled vehicle body 1. The base plate 30B has a front portion extending obliquely forward in front downward, and a rear portion and an intermediate portion provided as a horizontal surface when the self-propelled vehicle body 1 is in a horizontal position. The base plate 30B having the configuration above is provided in a position covering the rear wheel 12 from a plan view. The base plate 30B, which is positioned above the rear wheel from a side view, also functions as a mud cover of the rear wheel 12.

Figure 4:
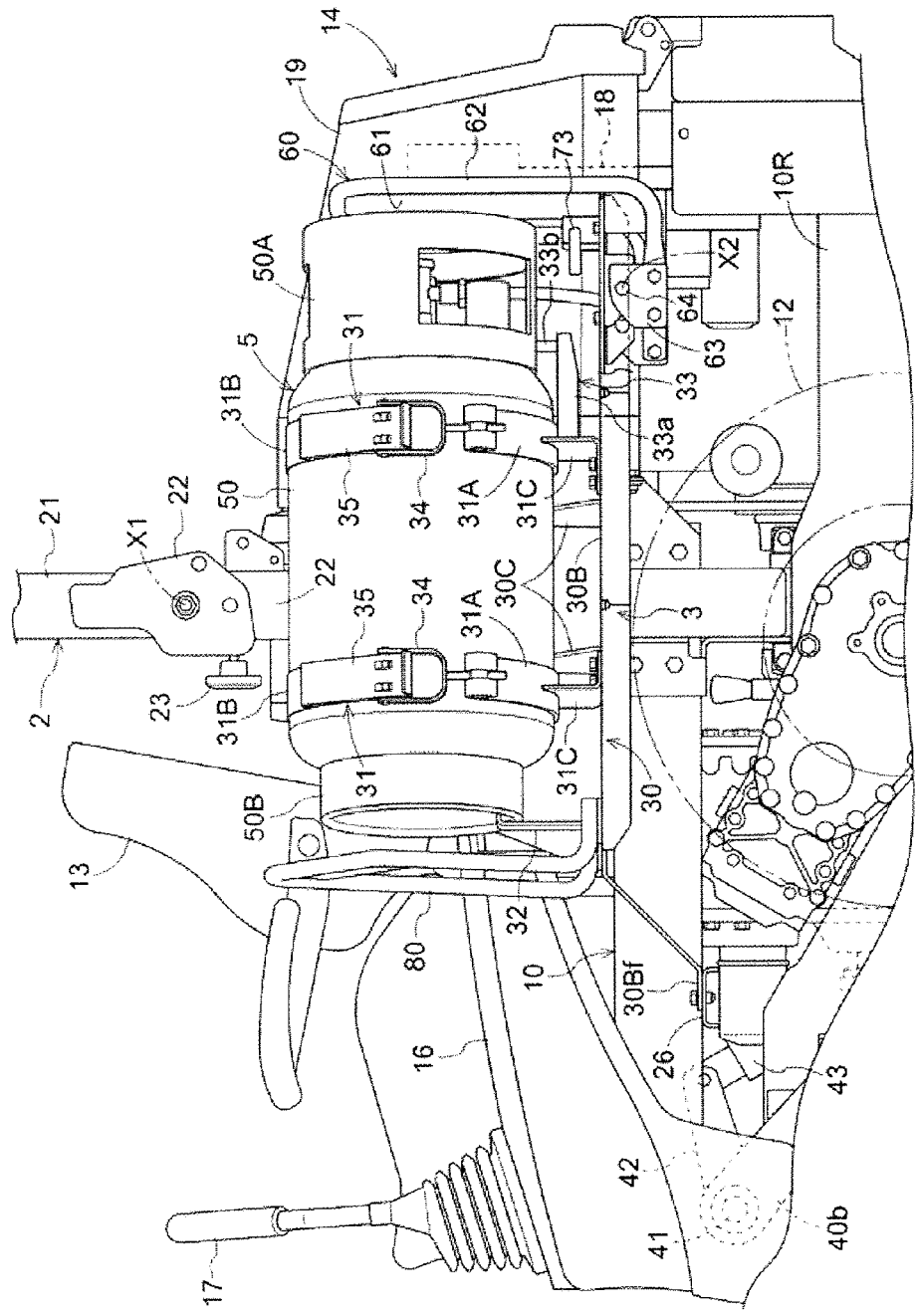
FIG. 4 is a side view illustrating the rear upper side of the riding mower.
Figure 5:
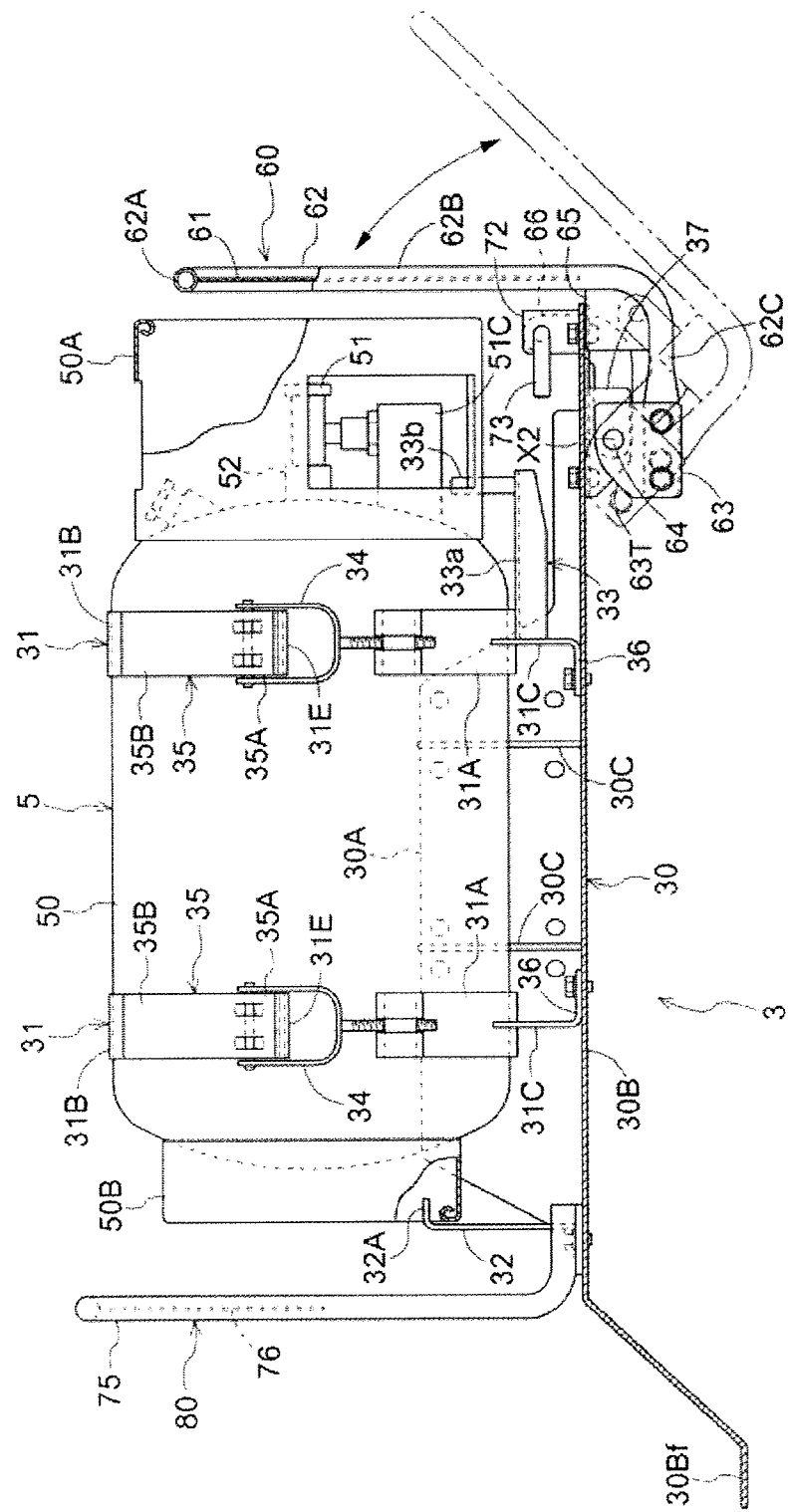
FIG. 5 is a side view illustrating the vicinity of a mounted fuel gas cylinder.

A forward-facing mounting piece 30Bf folded in a horizontal direction is integrally provided to a front end portion of the base plate 30B. As shown in FIGS. 4 and 5, the mounting piece 30Bf is bolt connected to an upper surface of a front support frame 26 extending externally to the side from the vehicle frame 10.

The wrap fastener 31 is provided with a lower band member 31A fixed to the base plate 30B, an upper band member 31B connected to right and left internal ends of the lower band member 31A through a hinge 31H, a fork-shaped member 34 whose base end portion is pivotally supported in right and left external upper ends of the lower band member 31A, and a lock member 35 swingably and pivotally supported by a pair of tip ends of the fork-shaped member 34. The lock member 35 is provided with a contact arm portion 35A extending downward from the tip ends of the fork-shaped member 34, and an elongated operation arm portion 35B extending upward from the tip ends of the fork-shaped member 34. The lock member 35 can fix the gas cylinder 5 with tensile force being applied between the lower band member 31A and the upper band member 31B by pushing the operation arm portion 35B toward the gas cylinder 5 in a state where the lower end of the contact arm portion 35A is engaged with an engaged portion 31E formed by bending the tip end of the lower band member 31B.

As shown in FIG. 2, the wrap fastener 31 is attached such that the gas cylinder 5 is mounted having the central axis L1 tilted by a predetermined angle θ and thereby the axial direction of the gas cylinder 5 fixed by the wrap fastener 31 is closer to the anteroposterior centerline L0 of the self-propelled vehicle body 1 toward the rear side from a plan view. Thus, the gas cylinder 5 fixed by the wrap fastener 31 is mounted in a state where the rear end side is also tilted closer to the center in the lateral direction of the vehicle body relative to the base plate 30B provided along the anteroposterior direction of the self-propelled vehicle body 1. The predetermined angle θ is set to approximately 5° to 10° at which the central axis L1 of the gas cylinder 5 fixed by the wrap fastener 31 is tilted against the anteroposterior centerline L0 of the self-propelled vehicle body 1.

As shown in FIG. 2, the predetermined angle θ is provided in view of the position of the central axis L1 of the gas cylinder 5 aligned with a tangent L2 relative to a rotation trajectory R of an rear end portion of the self-propelled vehicle body 1 in the case where the self-propelled vehicle body 1 is rotated around the pivoting center P1, which is the central position of a line "m" connecting the rotation axes of the rear wheels 12. The gravity center "g" of the gas cylinder 5 in the anteroposterior direction is positioned proximate to the rollover protection frame 2, but slightly closer to the rear side of the vehicle body than the line "m" connecting the rotation axes of the rear wheels 12. The tangent L2 relative to the rotation trajectory R and the central axis L1 of the gas cylinder 5 are provided orthogonal to a normal line "n" passing through the gravity center "g".

Figure 6:
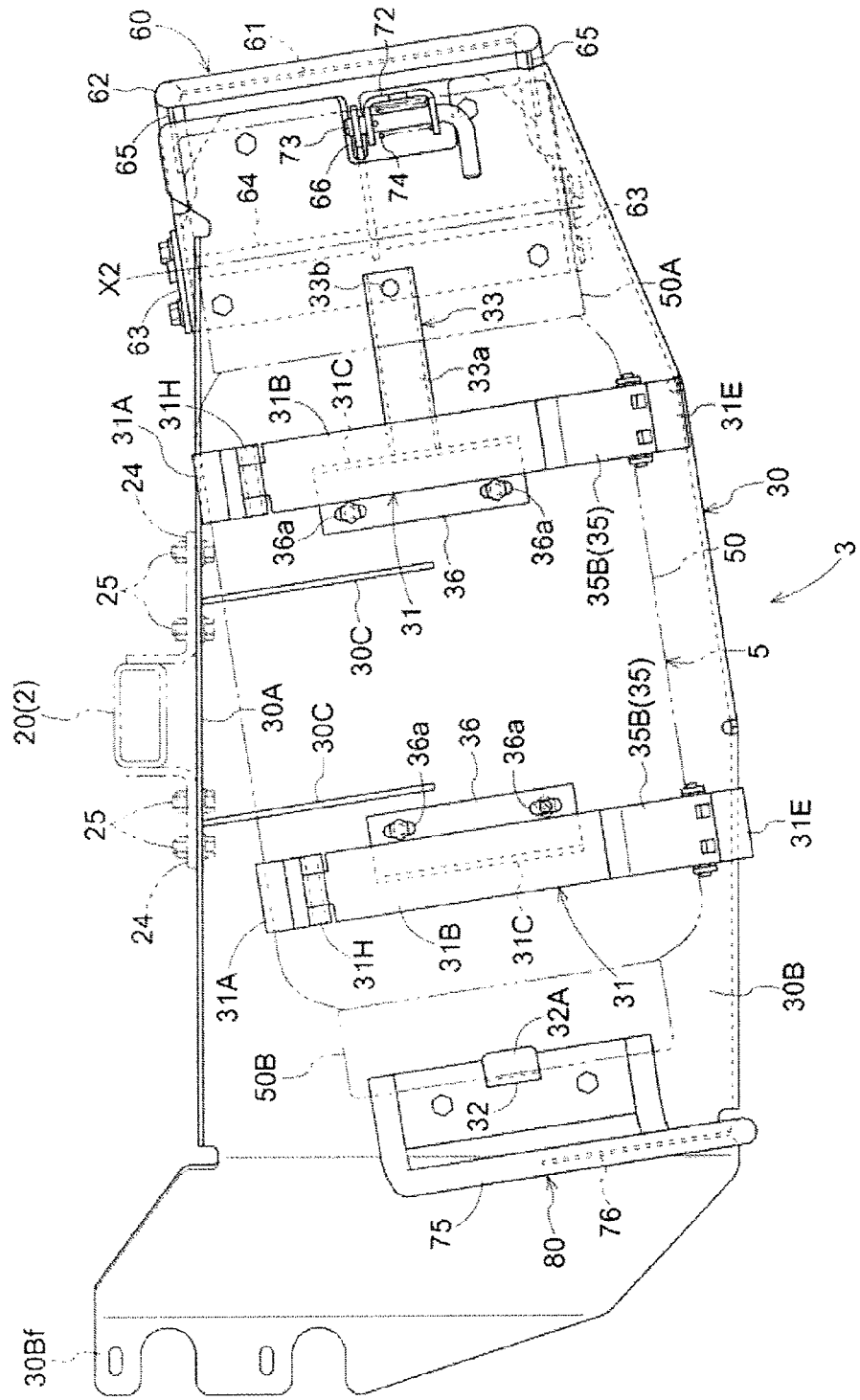
FIG. 6 is a plan view illustrating the vicinity of the mounted fuel gas cylinder.

As shown in FIG. 6, the foot bracket 31C of the wrap fastener 31 is configured to be bolt connected and fixed to the base plate 30B. A bolt hole 36a provided in a mounting plate portion 36 of the foot bracket 31C mounted to the base plate 30B is formed into an elongated hole having a long diameter in a direction orthogonal to the central axis L1 of the gas cylinder 5 to be fixed, thus enabling fine adjustment of the mounting position of the wrap fastener 31 to the base plate 30B.

As shown in FIGS. 4 through 6, a portion close to the front portion of the base plate 30B is fixedly provided with the anteroposterior positioner 32 for determining the mounting position of the gas cylinder 5 in the anteroposterior direction. The lower end portion of the anteroposterior positioner 32 is welded and fixed to the base plate 30B. The vicinity of the upper end of the anteroposterior positioner 32 is provided with an engaging portion 32A formed by bending forward. The gas cylinder 5 is positioned appropriately in the anteroposterior direction of the wrap fasteners 31 by engaging with an edge of an annular skirt portion 50B as an supporting leg of the gas cylinder 5 in a state where the upper band members 31B of the wrap fasteners 31 are open upward and the gas cylinder 5 is mounted sideways on the upper sides of the lower band members 31A in which the gas outlet 51 of the gas cylinder 5 faces backward.

The circumferential positioner 33 extends from the foot bracket 31C of the wrap fastener 31 on the rear side, the circumferential positioner 33 positioning the gas cylinder 5 around the central axis L1. The circumferential positioner 33 is composed of a channel-shaped support body 33a and a pin 33b, the support body 33a extending rearward from the rear surface of the foot bracket 31C on the rear side, the pin 33b standing upward on the rear end side of the support body 33a.

As shown in FIGS. 4 through 6, a container 50 of the gas cylinder 5 is placed sideways such that the gas outlet 51 and a relief valve 53 face backward, and the pin 33b of the circumferential positioner 33 is inserted into a positioning hole 54 formed in a tubular protector 50A provided in a rear end of the container 50 of the gas cylinder 5. Consequently, the gas cylinder 5 is positioned appropriately in the circumferential direction.

Specifically, since an opening and closing knob 51C of the gas outlet 51 and the relief valve 53 are positioned on the upper side, gas can be extracted from above a liquid surface of liquid gas inside the container 50 of the gas cylinder 5. Also, the positioning hole 54 is an elongated hole extending in parallel with the shaft center of the gas cylinder 5, so that the edge of the skirt portion 50B can be released from an engaged state with the engaging portion 32A of the anteroposterior positioner 32 by displacing the gas cylinder 5 on the foot bracket 31C in the anteroposterior direction of the vehicle body.

In a state where the gas cylinder 5 is supported by the support device 3, the upper end of the gas cylinder 5 is positioned lower than the upper end of the driver's seat 13 and positioned lower than the upper end of the lower frame 20 of the rollover protection frame 2. Furthermore, the gas cylinder 5 is disposed at a position similar to or lower than the upper end of the hood 19.

Structure of Rear Guard Member

The self-propelled vehicle body 1 of the riding mower has the driver's seat 13 provided between the front wheels 11 and the rear wheels 12, and the hood 19 provided in the rear of the driver's seat to cover the engine 18. The gas cylinder 5 is mounted on the upper surface of the base plate 30B (one example of the retaining member) provided substantially horizontally on the right and left sides of the hood 19 above the rear wheels 12. As shown in FIGS. 3 through 6, according to a feature of the riding mower of the present embodiment, a rear guard member 60 is provided to be switchable between a protection position opposed to the rear surface of the gas cylinder 5 and an open position apart from the rear surface of the gas cylinder 5, so that the gas outlet 51 (one example of the operation section) or the relief valve 53 (one example of the operation section) in the rear surface of the gas cylinder 5 mounted on the support device 3 is protected from a tree branch and the like especially when the riding mower moves backward.

The rear guard member 60 is swingably supported between the protection position and the open position around a shaft center X2 (one example of a lateral shaft center provided below the gas cylinder 5) extending substantially horizontally below the base plate 30B. The rear guard member 60 has a substantially rectangular shielding plate 61 made of a steel plate, and a frame member 62 welded and fixed to the outer circumferential end surface except the lower side of the shielding plate 61.

In the example shown in the drawings, the frame member 62 has an upper edge portion 62A, a pair of side edge portions 62B, and a pair of supported portions 62C. The upper edge portion 62A extends in the horizontal direction of the self-propelled vehicle body 1 along the upper end of the shielding plate 61. The side edge portions 62B extend downward from the both ends of the upper edge portion 62A via a curved portion. The supported portions 62C extend from the lower ends of the side edge portions 62B via a curved portion toward the front of the vehicle body.

The frame member 62 is pivotally supported with respect to a fixing bracket 37 fixed to the lower surface of the base plate 30B by a bolt and a nut. More specifically, the fixing bracket 37 is substantially U-shaped, and a through hole (whose center corresponds to the shaft center X2) is formed in a pair of flange portions extending downward from the both ends of the fixing bracket 37. A single linear round bar 64 is rotatably inserted into the through holes in the horizontal position, and the supported portions 62C of the frame member 62 are fixed by a bolt and a nut in the lower portion of a pentagonal plate-shaped swing bracket 63 fixed by welding and the like to the both ends of the round bar 64.

Lock Mechanism of Rear Guard Member

A lock mechanism is provided in the vicinity of the upper surface of the base plate 30B to restrict the rear guard member 60 in the protection position. The lock mechanism has an L-shaped locked piece 66, and a lock device 70 to be engaged with the locked piece 66. The locked piece 66 is fixed to the longitudinally intermediate portion of the round bar 64, and the lock device 70 is provided in the upper surface of the base plate 30B.

The locked piece 66 is provided with a first arm 66A extending in the anteroposterior direction, and a second arm 66B extending upward from the rear end of the first arm 66A. In the locked piece 66, the round bar 64 is inserted into an engaging hole formed in the vicinity of the end portion of the first arm 66A, and the second arm 66B is welded and fixed to the outer circumference of the round bar 64 in an angle position extending in substantially parallel with the side edge portions 62B of the frame member 62. A lock hole 66H is formed as a through hole in the vicinity of the upper end of the second arm 66B.

A single notch 30F is formed in the rear end of the base plate 30B in a state of extending along the anteroposterior direction of the self-propelled vehicle body 1 so as to receive the second arm 66B of the locked piece 66 from below when the rear guard member 60 is operated by manually swinging from the open position to the protection position.

The lock device 70 has a U-shaped lock bracket 72 fixed by welding and the like to the upper surface of the base plate 30B in a substantially forward open position. Through holes 72a are respectively formed in rectangular flange portions 72F which are positioned in the right and left both ends of the lock bracket 72.

The lock device 70 includes a substantially L-shaped lock pin 73 inserted into the two through holes 72a in a laterally movable state. The lock pin 73 has a pin body 73A of a relatively long length, and an operation section 73B. The pin body 73A is inserted into the two through holes 72a substantially along the width direction of the self-propelled vehicle body 1. The operation section 73B extends upward from the base end portion of the pin body 73A.

Figure 9:
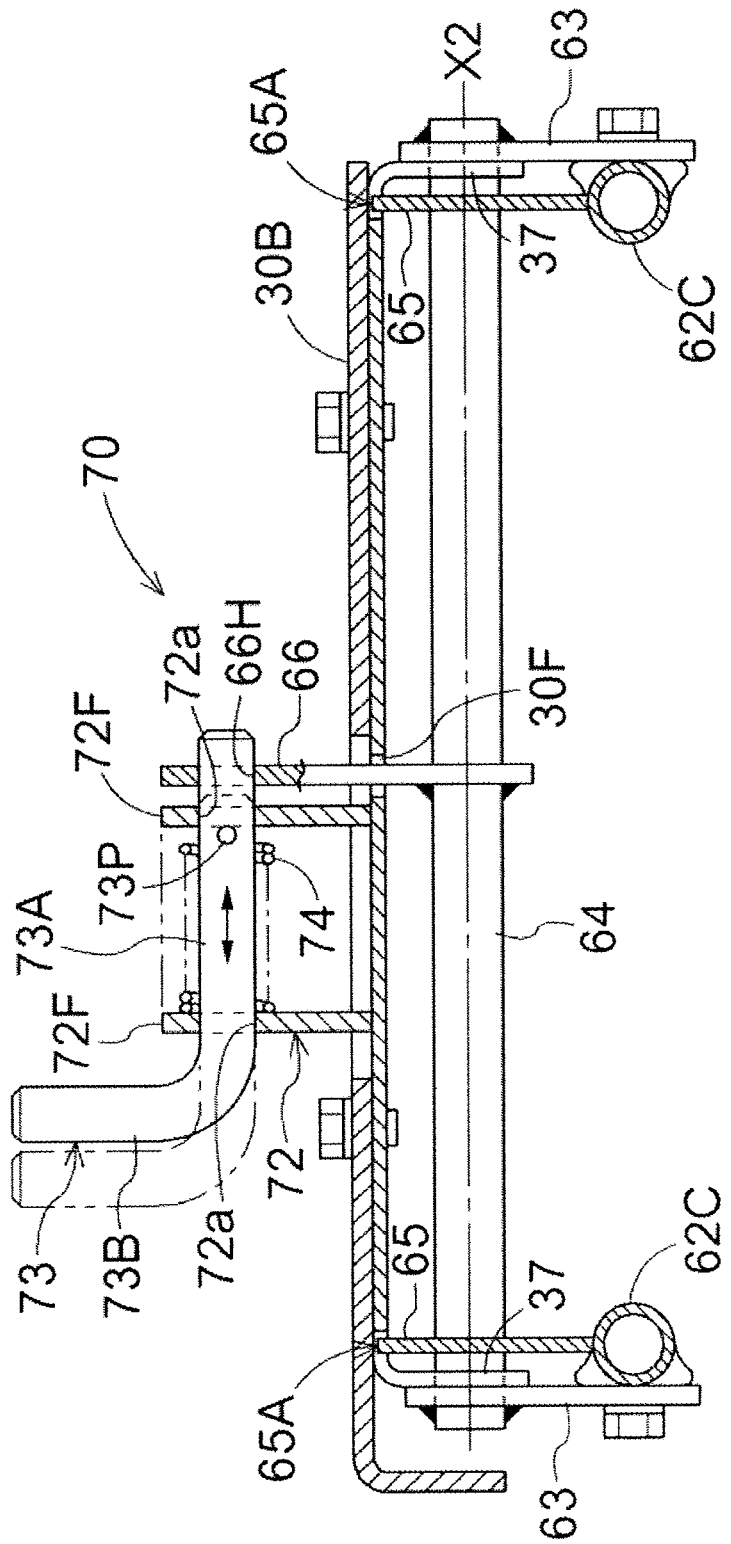
FIG. 9 is a rear view illustrating an attachment section of a guard member.

A coil spring 74 is fit onto the pin body 73A in a position between the right and left flange portions 72F of the lock bracket 72. The coil spring 74 is positioned between a stop pin 73P and the flange portion 72F closer to the operation section 73B. The stop pin 73P is inserted into a through hole radially extending in a position close to the tip end of the pin body 73A. The coil spring 74 applies a constant biasing force of a direction for displacing the lock pin 73 to the right side of FIG. 9 via the stop pin 73P.

Operation of Lock Mechanism

The rear guard member 60 is locked in the protection position which is opposed to the rear surface of the as cylinder 5 at the time of working by the riding mower. In order to switch the rear guard member 60 from the open position to the protection position and lock the rear guard member 60, first, the rear guard member 60 is, for example, manually retained in the protection position in a state where the tip end of the pin body 73A is retreated outside the notch 30F by pulling the lock pin 73 outside (left side of FIG. 9) against the biasing force of the coil spring 74. Next, by loosening force to pull the lock pin 73 outside, the tip end of the lock pin 73 is inserted into the lock hole 66H of the second arm 66B of the locked piece 66 projecting upward from the notch 30F with the biasing force of the coil spring 74, and locking is finished.

On the other hand, in order to open the rear of the gas cylinder 5 to exchange the gas cylinder 5, first, the lock device 70 is released from the locked state by pulling the lock pin 73 outside against the biasing force of the coil spring 74 and extracting the tip end of the pin body 73A from the lock hole 66H. Next, while keeping this state, the rear guard member 60 is manually switched into the open position.

Protection Position of Rear Guard Member

Figure 3:
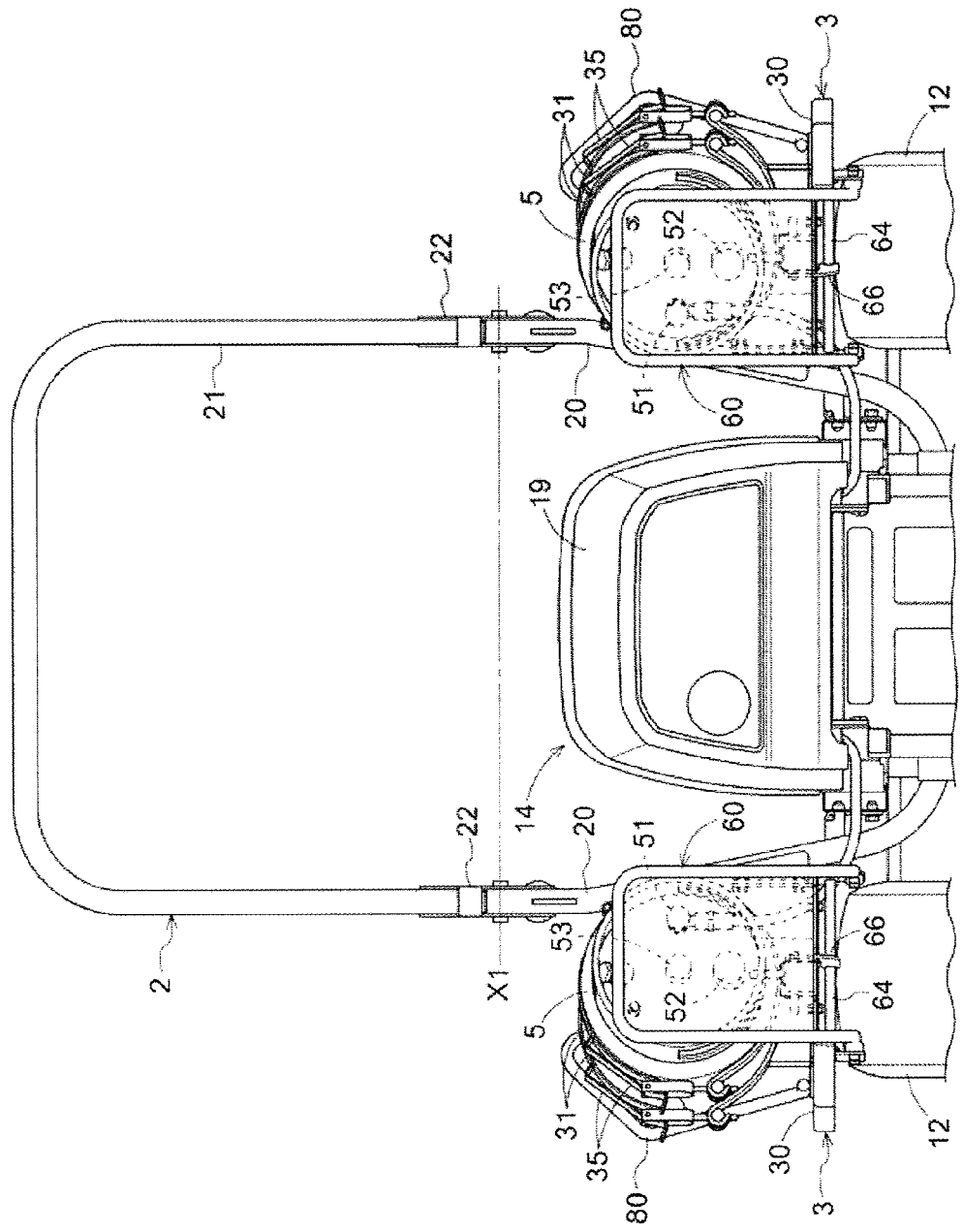
FIG. 3 is a rear view illustrating the upper side of the riding mower.
Figures 10A, 10B:
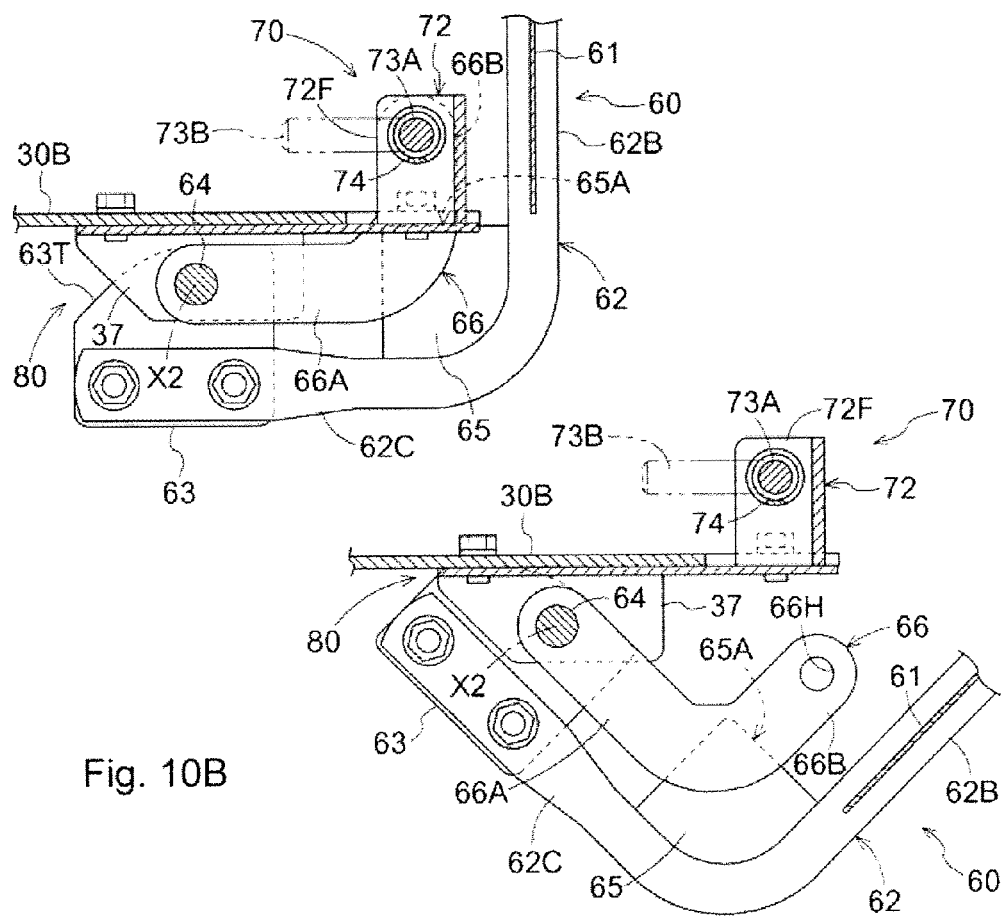
FIGS. 10A and 10B are side views illustrating the attachment section of the guard member.

The rear guard member 60 is configured such that the upper end of the rear guard member 60, i.e., the upper edge portion 62A of the frame member 62 in the protection position is located lower by several centimeters than the inner surface of the upper end portion of the tubular protector 50A (one example of the protection member) in the rear surface of the gas cylinder 5. Thus, even when the rear guard member 60 is still in the protection position as shown in FIGS. 3, 4, 5 (shown by a solid line), FIG. 10A, and the like, it is possible to visually confirm an indicated value of a remaining amount gauge 52 (one example of the operation section), that shows the remaining amount of LPG, from a gap between the rear guard member 60 and the protector 50A. Generally, the remaining amount gauge 52 is provided in the center of the rear surface of the gas cylinder 5.

The rear guard member 60 is also configured to form a gap of approximately 5-8 cm between the rear guard member 60 in the protection position and the protector 50A of the gas cylinder 5 from a side view. An operator can therefore insert the hand into the gap between the rear guard member 60 and the protector 50A while keeping the rear guard member 60 in the protection position, and rotate the opening and closing knob 51C of the gas outlet 51 to switch opening and closing of the gas outlet 51.

A substantially triangular reinforcement plate 65 is welded and fixed to the inside of each the right and left curved portions between the side edge portions 62B and the supported portions 62C in a position along the anteroposterior direction of the self-propelled vehicle body 1. An upper end surface 65A of each the right and left reinforcement plate 65 substantially contacts the lower surface of the base plate 30B in the protection position of the rear guard member 60. Thus, in a case where a foreign material such as a tree branch collides with the rear surface of the rear guard member 60 at the time of moving the riding mower backward, the lower surface of the base plate 30B receives force applied from the foreign material through the reinforcement plate 65. The upper end of the rear guard member 60 is not pressed onto the gas cylinder 5 unless the force exceeds a predetermined value.

Even when the force applied from the foreign material exceeds a predetermined value, a part of the side edge portions 62B or the upper edge portion 62A contacts the end surface the protector 50A of the gas cylinder 5 so as to receive the rear guard member 60, and thereby reduce a likelihood that the rear guard member 60 will inadvertently contact the operation section of the gas cylinder 5.

Open Position of Rear Guard Member

The gravity center of the rear guard member 60 is positioned in the rear upper portion with respect to the swing shaft center X2 located in the vicinity of the fixing bracket 37. Consequently, when the lock mechanism 60L is released from the locked state and the rear guard member 60 is released from the hand, the rear guard member 60 will fall down by its own weight from the protection position to the open position shown in FIG. 5 (shown by a two-dot chain line) and FIG. 10B.

The falling down movement of the rear guard member 60 is stopped in a predetermined position where an arbitrary portion of the rear guard member 60 (especially the upper edge portion 62A located in the upper end) does not project backward from the vicinity of the rear end of the hood 19 by the operation of the attitude regulating mechanism 80 provided between the rear guard member 60 and the base plate 30B (one example of the retaining member).

The attitude regulating mechanism 80 is constructed by a linear contact surface 63T and the lower surface of the base plate 30B. The linear contact surface 63T is a part of the outer circumferential portion of the pentagonal swing bracket 63 provided in the vicinity of the lower end of the rear guard member 60, which obliquely extends from above the shaft center X2 toward the front lower side when the rear guard member 60 is in the protection position. The lower surface of the base plate 30B receives the contact surface 63T from above when the rear guard member 60 is in the open position.

Structure of Front Guard Member

As shown in FIGS. 1 through 7, a fixed type front guard member 80 is provided in the vicinity of the front end of the right and left base plates 30B to oppose the front surface of the gas cylinder 5 mounted on the support device 3. The front guard member 80 stands substantially above the base plates 30B in a position closer to the front than the anteroposterior positioner 32.

Figure 7:
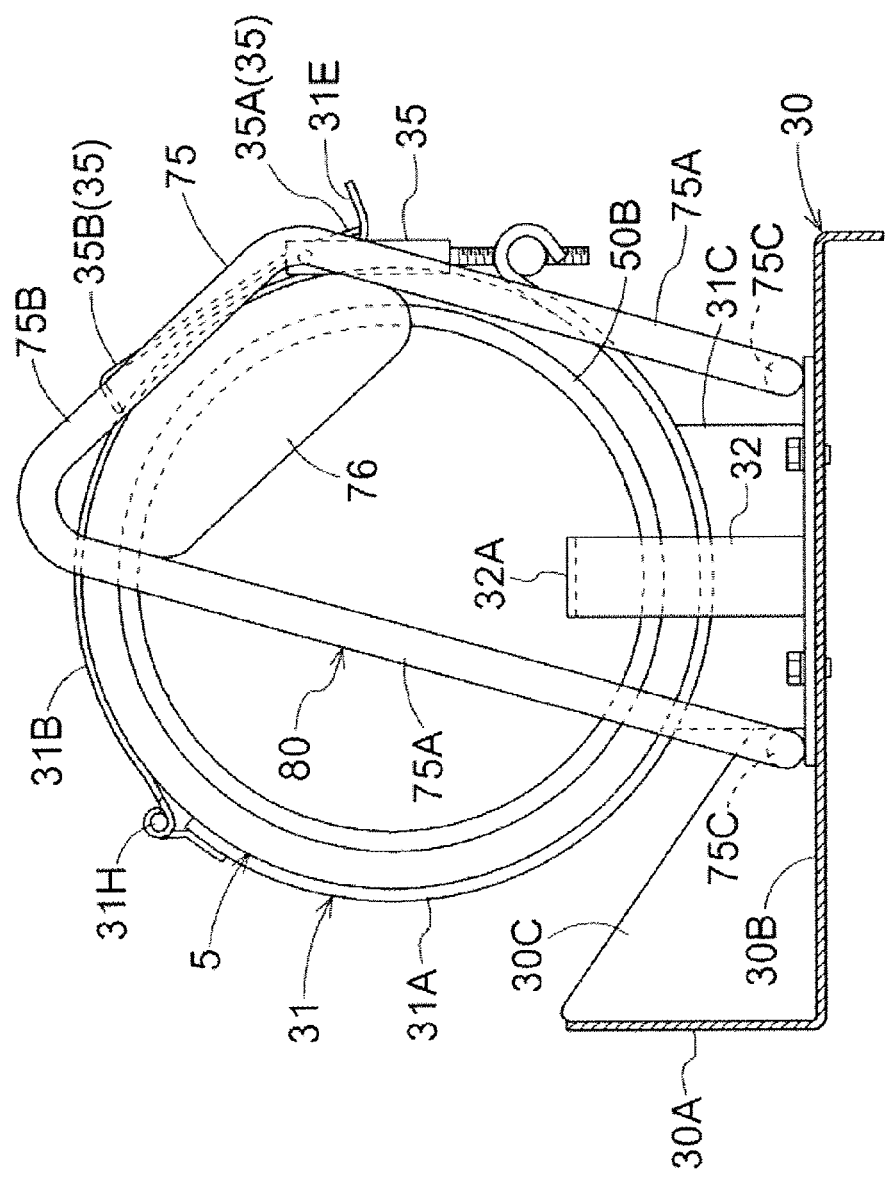
FIG. 7 is a front view illustrating the vicinity of the mounted fuel gas cylinder.
Figure 8:
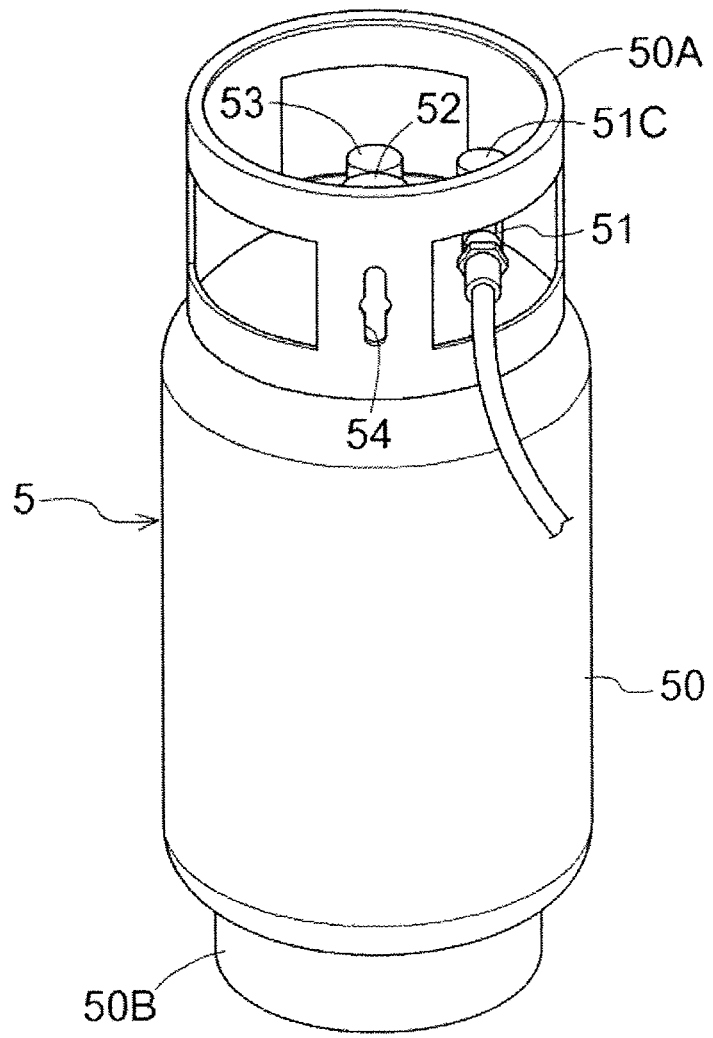
FIG. 8 is a perspective view illustrating the fuel gas cylinder.

As shown in FIG. 7, the front guard member 80 has a substantially U-shaped support member 75 formed by bending a steel pipe and the like, and a plate-shaped protection member 76 extending in the vicinity of the upper edge of the support member 75. The support member 75 has two main support portions 75A extending upward from the vicinity of the upper surface of the base plates 30B in parallel with each other, and an auxiliary support portion 75B connecting the upper ends of the two main support portions 75A. The support member 75 is fixed by welding and the like to the lower end portion of the anteroposterior positioner 32 through fixed portions 75C extending backward from the lower ends of the two main support portions 75A.

The two main support portions 75A extend obliquely upward from the fixed portions 75C located closer to the lower end toward the right and left outsides of the self-propelled vehicle body 1. The auxiliary support portion 75B extends obliquely upward from the upper end of the internal main support portion 75A toward the upper end of the external main support portions 75A. Consequently, the external main support portions 75A and the auxiliary support portion 75B extend along the outer circumferential surface of the gas cylinder 5.

The plate-shaped protection member 76 is welded to the inner edge portions of the two main support portions 75A in the vicinity of the upper end and the entire inner edge portion of the auxiliary support portion 75B in such a way of enclosing a substantially parallelogrammic area which extends along the auxiliary support portion 75B in the vicinity of the inner upper end of the support member 75 and along an area of the front surface of the gas cylinder 5 closer to the upper outside.

As shown in FIG. 7, the front guard member 80 extends laterally outside to cover the operation arm portion 35B of the lock member 35 which constructs the wrap fastener 31 from a rear view. Consequently, mainly by the plate-shaped protection member 76, the front guard member 80 inhibits a state where the operation arm portion 35B collides with a tree branch and the like and is inadvertently operated into the open position especially at the time of moving the riding mower forward. Also, the main support portions 75A and the auxiliary support portion 75B of the front guard member 80 are configured to be grabbed by an operator when the operator gets on and off the driver's seat 13, and thereby aid the operator to get on and off.

Alternative Embodiment (1) The configuration of engine 18 is not limited to one same as that of a water-cooled gasoline engine and having a device for fuel supply designed for LP gas as explained in the embodiment above. The engine 18 may have a configuration same as an air-cooled gasoline engine and have a device for fuel supply designed for LP gas.

(2) The gas cylinder 5 supported by the support device 3 is not limited to an LP gas type, but may be any gas cylinder 5 of a cylinder type to be filled.

(3) In the embodiment above, the central axis L1 of the gas cylinder 5 mounted on the support device 3 is tilted relative to the anteroposterior centerline L0 of the self-propelled vehicle body 1 such that rear side is closer to the centerline L0 in the lateral direction of the vehicle body. The base plate 30B of the support device 3 is provided such that the left and right side edge portions are parallel to the anteroposterior centerline L0 of the self-propelled vehicle body 1. Alternatively, the side edge portions of the base plate 30B of the support device 3 may also be tilted such that the rear side is closer to the anteroposterior centerline L0 of the self-propelled vehicle body 1 in the lateral direction of the vehicle body. In this case, the left and right portions of the side edge portions of the base plate 30B of the support device 3, or only external side edges may be tilted so as to be closer to the anteroposterior centerline L0 of the self-propelled vehicle body 1.

(4) The rear guard member 60 may be swingably supported around a vertical shaft center located on the side of the rear guard member 60, or may be slidably supported in the anteroposterior direction of the self-propelled vehicle body 1.

(5) The tip end of the lock pin 73 may be conically-shaped so as to automatically retreat the lock pin 73 by the locked piece 66, and project again to enter the lock hole 66H when the rear guard member 60 is operated by pressing from the open position to the protection position.

The riding mower of the present invention is not limited to a mid-mount type riding mower as illustrated in the embodiment, but may also be applicable to a front-mount type riding mower, for example. Furthermore, the mower is not limited to a rear discharge type, but may be a side discharge type or a mulching type.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A riding mower having a pair of right and left front wheels, a pair of right and left rear wheels, a driver seat provided between the rear wheels and the front wheels, an engine provided at the rear of the driver seat, and a mower provided under the driver seat, wherein
    the riding mower is capable of receiving thereon at least one fuel gas cylinder mounted sideways on a side of the engine in which an operation section of the fuel gas cylinder faces backward,
    the riding mower comprising:
    a guard member that is opposed to a portion of the operation section of the fuel gas cylinder and is positionable between a protection position covering or arranged over the portion of the operation section and an open position exposing the portion of the operation section of the fuel gas cylinder,
    wherein the guard member is pivotally supported in or coupled to a retaining member that retains the fuel gas cylinder.

2. The riding mower according to claim 1, wherein an upper end of the guard member in the protection position is located lower than an inner surface of an upper end portion of a projecting tubular or annular valve protection member.

3. The riding mower according to claim 1, wherein the guard member is pivotally supported at a lower portion of the guard member.

4. The riding mower according to claim 3, wherein an attitude regulating mechanism is provided between the guard member and the retaining member to regulate attitude of the guard member in the open position within a range where the upper end of the guard member does not project backward from a vicinity of a rear end of a hood that covers the engine.

5. A riding mower comprising:
    a pair of right and left front wheels;
    a pair of right and left rear wheels;
    a driver seat arranged between the rear wheels and the front wheels;
    an engine arranged behind the driver seat;
    a mower arranged under the driver seat;
    at least one sideways oriented fuel gas cylinder located on a lateral side of the engine such that an operation section of the fuel gas cylinder faces backward;

at least one guard member movable between a first position guarding the operation section and a second position exposing the operation section;

an attitude regulating mechanism arranged between the guard member and a retaining member that retains the fuel gas cylinder; and the attitude regulating mechanism controlling an attitude of the guard member in the second position within a range where an upper end of the guard member does not project backward from a vicinity of a rear end of the riding mower.

6. A riding mower comprising:

a driver seat arranged between front and rear wheels;

an engine disposed behind the driver seat;

a mower provided under the driver seat;

at least one fuel gas cylinder having an operation section and an opposite end and being mounted sideways on a side of the engine so that the operation section faces a rear end of the riding mower;

at least one guard member movable between a first position guarding the operation section and a second position exposing the operation section;

the at least one guard member comprising a shielding plate and a frame member fixed to an outer circumferential end surface;

an attitude regulating mechanism arranged between the guard member and a retaining member that retains the fuel gas cylinder; and the attitude regulating mechanism controlling an attitude of the guard member in the second position within a range where an upper end of the guard member does not project backward from a vicinity of a rear end of the riding mower.

* * * * *